United States Patent
Xu et al.

(10) Patent No.: US 12,177,729 B2
(45) Date of Patent: Dec. 24, 2024

(54) CELL SET BASED MOBILITY

(71) Applicant: Apple Inc., Cupertino, CA (US)

(72) Inventors: Fangli Xu, Beijing (CN); Dawei Zhang, Saratoga, CA (US); Haijing Hu, Beijing (CN); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 432 days.

(21) Appl. No.: 16/487,039

(22) PCT Filed: Aug. 28, 2018

(86) PCT No.: PCT/CN2018/102701
§ 371 (c)(1),
(2) Date: Aug. 19, 2019

(87) PCT Pub. No.: WO2020/041972
PCT Pub. Date: Mar. 5, 2020

(65) Prior Publication Data
US 2021/0368400 A1 Nov. 25, 2021

(51) Int. Cl.
*H04W 36/00* (2009.01)
*H04W 36/02* (2009.01)
*H04W 48/20* (2009.01)

(52) U.S. Cl.
CPC ............. *H04W 36/0058* (2018.08); *H04W 36/0061* (2013.01); *H04W 36/023* (2013.01); *H04W 48/20* (2013.01); *H04W 36/00838* (2023.05)

(58) Field of Classification Search
CPC ............. H04W 36/04; H04W 36/023; H04W 36/14; H04W 36/30; H04W 36/32;
(Continued)

(56) References Cited

U.S. PATENT DOCUMENTS

| 9,088,339 B2 | 7/2015 | Christensen |
| 10,034,320 B2 | 7/2018 | Shi |

(Continued)

FOREIGN PATENT DOCUMENTS

| CN | 101998556 | 3/2011 |
| CN | 102215485 | 10/2011 |

(Continued)

OTHER PUBLICATIONS

Office Action for CN Patent Application No. 201880096975.5; Feb. 29, 2024.

*Primary Examiner* — Quoc Thai N Vu
(74) *Attorney, Agent, or Firm* — Kowert, Hood, Munyon, Rankin & Goetzel, P.C.

(57) ABSTRACT

This disclosure relates to techniques for supporting cell set based mobility. A network may provide configuration information to a wireless device, relating to a current cell and possibly to one or more other cells in one or more cell sets. The wireless device and network may take various measurements. In response to the measurements and the configuration information, the wireless device may perform a cell change to one of the other cells.

18 Claims, 12 Drawing Sheets

(58) Field of Classification Search
CPC ......... H04W 36/0058; H04W 36/0085; H04W 36/06; H04W 36/08; H04W 36/0061; H04W 36/00835; H04W 36/00837; H04W 48/20; H04W 88/10
See application file for complete search history.

(56) References Cited

U.S. PATENT DOCUMENTS

| | | | |
|---|---|---|---|
| 2009/0156214 A1* | 6/2009 | Lee | H04W 36/0085 455/436 |
| 2009/0176492 A1* | 7/2009 | Kwon | H04W 72/542 455/446 |
| 2011/0281586 A1* | 11/2011 | Yu | H04W 36/165 455/436 |
| 2012/0238208 A1 | 9/2012 | Bienas | |
| 2014/0313969 A1* | 10/2014 | Kalhan | H04W 72/005 370/312 |
| 2015/0163827 A1 | 6/2015 | Ekici | |
| 2015/0381431 A1 | 12/2015 | Jung | |
| 2016/0037425 A1* | 2/2016 | Van Lieshout | H04W 36/30 370/332 |
| 2017/0311217 A1* | 10/2017 | Jung | H04W 36/00835 |
| 2019/0380073 A1* | 12/2019 | Martin | H04W 24/10 |
| 2019/0394698 A1* | 12/2019 | Jeong | H04W 36/08 |
| 2020/0229017 A1* | 7/2020 | Liu | H04W 36/0094 |

FOREIGN PATENT DOCUMENTS

| | | |
|---|---|---|
| CN | 105592508 | 5/2016 |
| CN | 107005932 | 8/2017 |
| WO | WO 2013/097517 A1 | 7/2013 |
| WO | 2016033779 | 3/2016 |
| WO | WO 2016/065840 A1 | 5/2016 |

\* cited by examiner

CELL SET BASED MOBILITY

TECHNICAL FIELD

The present application relates to wireless communication, including methods, systems, and apparatuses to provide cell set based mobility.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. For example, the design of cellular networks may increasingly include dense, small cell deployment. Therefore, improvements in the field are desired.

SUMMARY

Embodiments are presented herein of, inter alia, systems, apparatuses, and methods for performing cell set based mobility as part of wireless communications.

As noted above, the number of use cases for different classes of wireless devices with widely variable capabilities and usage expectations are growing. While many wireless communication systems primarily utilize stand-alone cell designs, dense, small cell deployments may be growing in use. For example, typical deployments in 5G New Radio (NR) may include dense, small cells, particularly in high frequency deployments. Such deployments may include cell sets. This disclosure presents various techniques for supporting mobility within and between cell sets.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
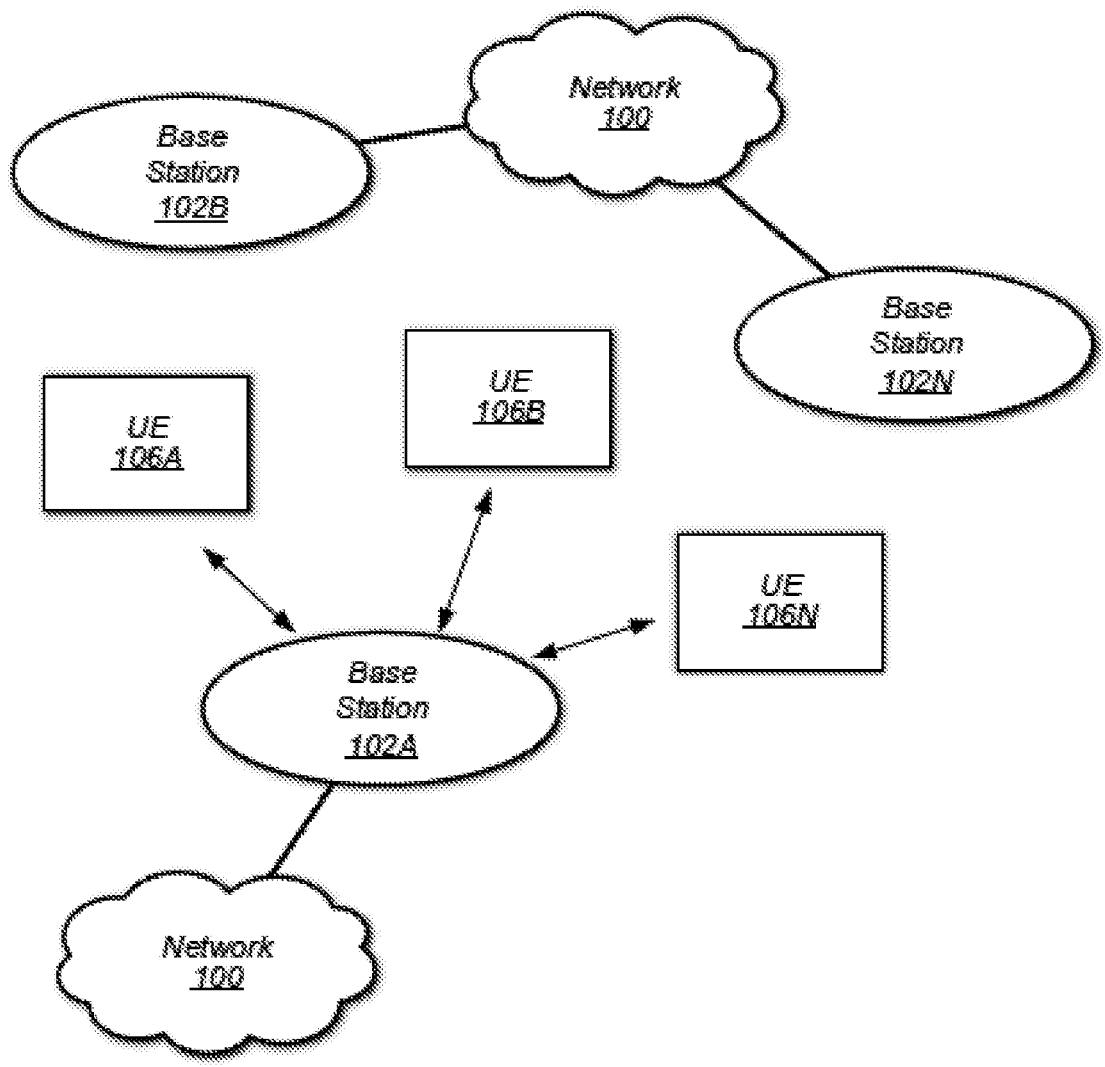
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
RLC: Radio Link Control
MAC: Media Access Control
PDCP: Packet Data Convergence Protocol
RF: radio frequency
DL: downlink
UL: uplink
NW: Network
BS: base station
MME: Mobility Management Entity
AC: access class
DOS: denial of service AS: access stratum
NAS: non-access stratum
SW: software
RAT: radio access technology
PLMN: public land mobile network
C-RNTI: cell radio network temporary identity Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
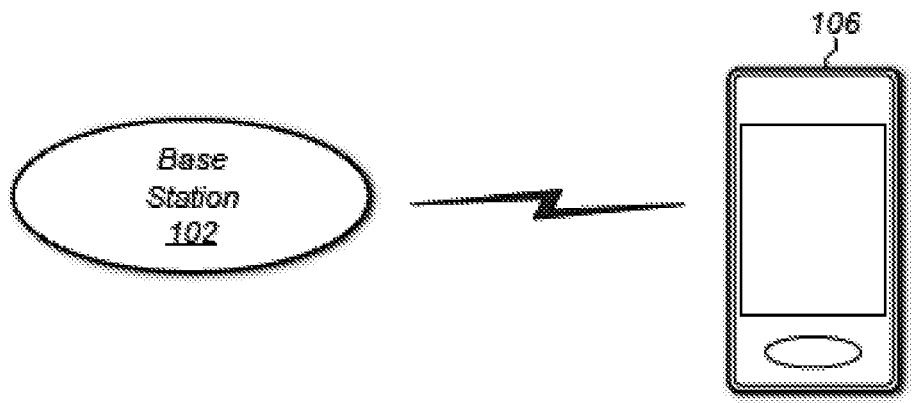
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for handling connection rejections as described herein, e.g., according to one or more of the methods of FIGS. 5-7. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
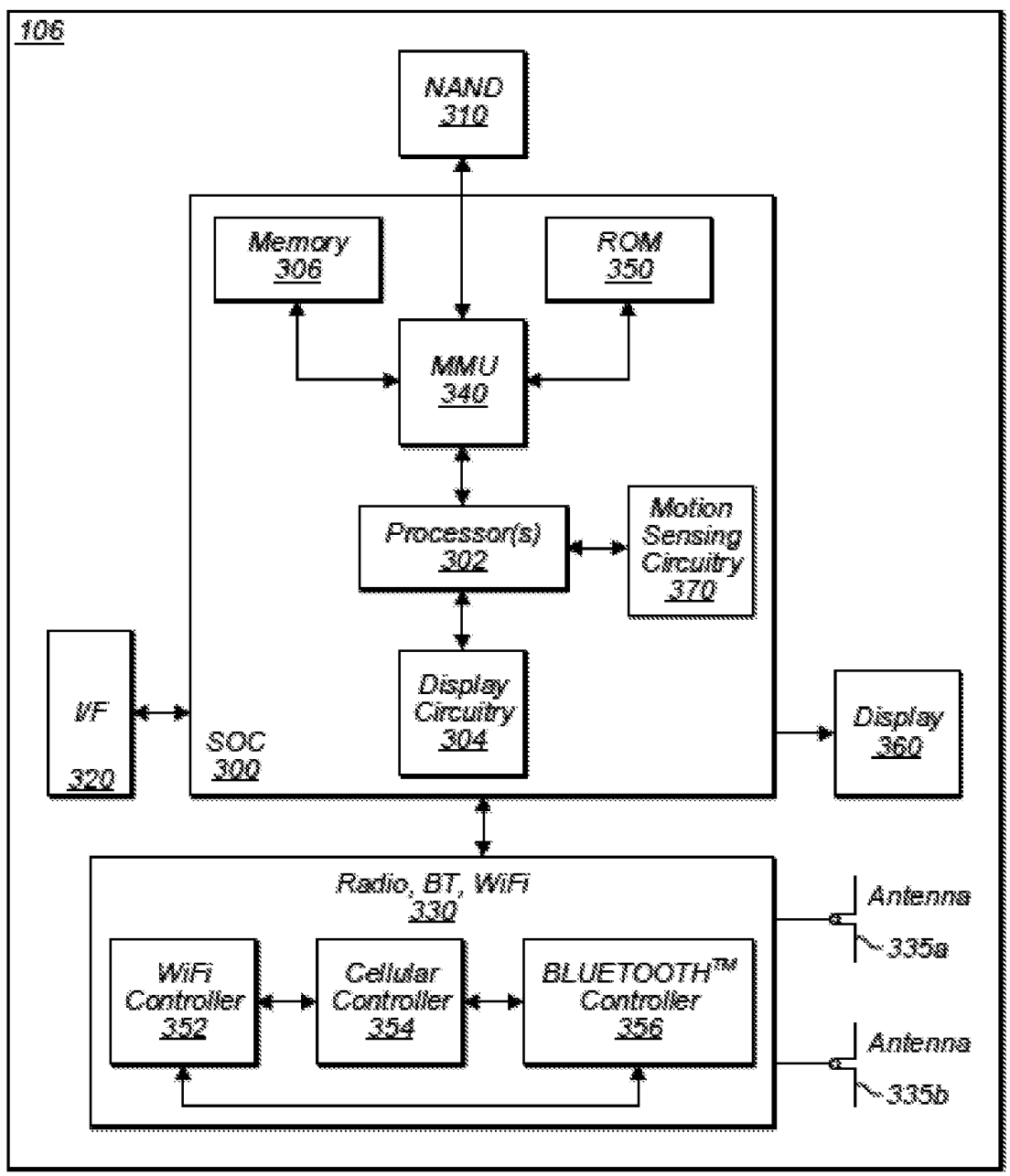
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b (and/or further additional antennas), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
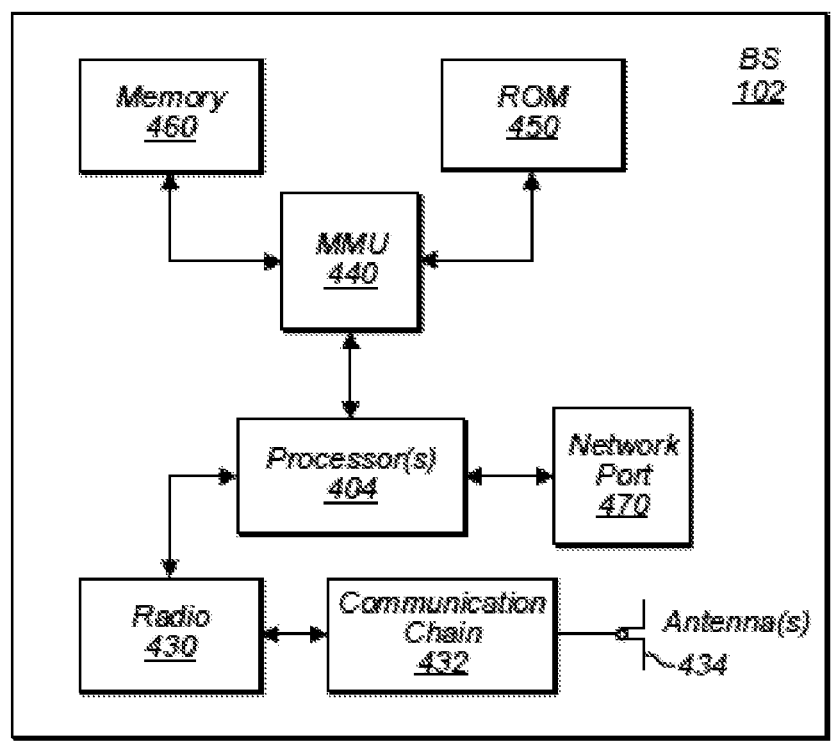
FIG. 4 illustrates an exemplary block diagram of a BS, according to some embodiments.

FIG. 4—Block Diagram of a Base Station (BS)

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs). The BS 102 may provide multiple cells which may be organized, grouped, or configured as one or more cell sets, according to some embodiments. One or more cell sets that are provided by BS 102 may also include cells provided by one or more additional base stations, according to some embodiments.

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

The BS 102 may be an eNodeB (eNB) or gNodeB (gNB), according to some embodiments.

Figure 5:
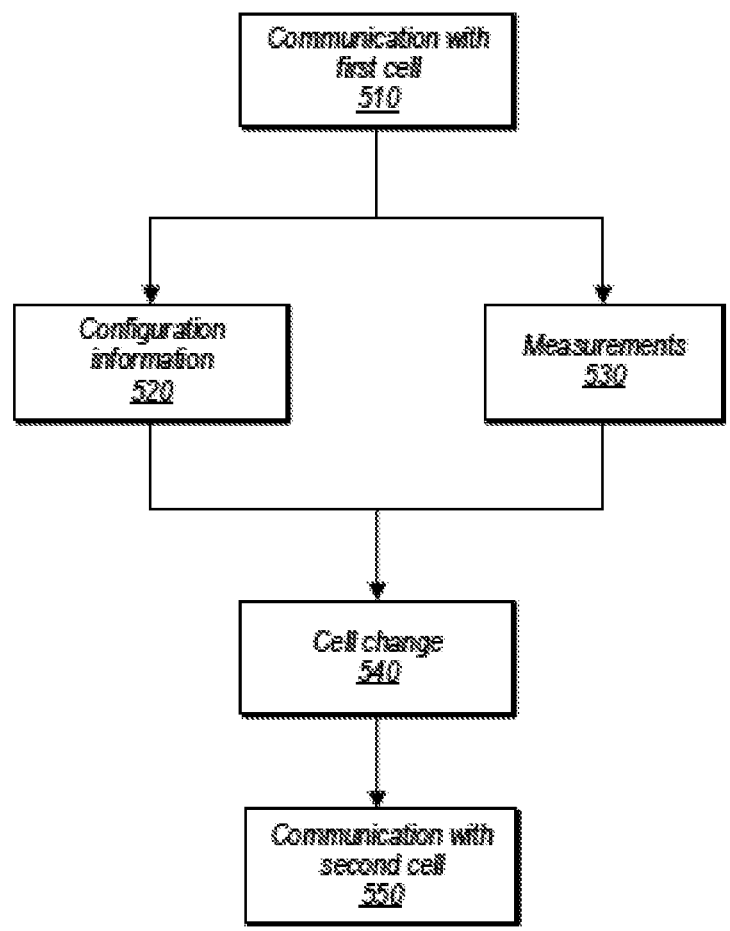
FIG. 5 is a flow chart diagram illustrating an exemplary method for performing cell set based mobility, according to some embodiments.

FIG. 5—Communication Flow Diagram

5G New Radio (NR) may increasingly include dense small cell deployment, especially in high frequency deployment such as unlicensed spectrum. In such deployments, multiple cells may be grouped, organized, or configured as a cell set. One or more base stations (e.g., BS 102) may provide cells for one or more cell sets. For example, a single BS may provide any number of cells in any number of cell sets. Some cell sets may include cells provided by more than one base station.

Small cell deployment may lead to certain challenges, according to some embodiments. For example, a high frequency of cell changes (e.g., handover or "HO") may lead to: increased signaling overhead (e.g., one HO may include three or more RRC messages, e.g., measurement report, handover command, and HO complete); frequent interruption to data transmission/reception (e.g., each HO may cause an interruption); and HO reliability reduction (e.g., a late measurement report from a UE to a BS may lead to late HO (e.g., HO failure) and thus reestablishment of the connection (e.g., RRC)).

One goal of NR may be to enhance mobility, e.g., by reducing the interruption time (e.g., a target interruption time may be 0ms) associated with handover (HO), reducing HO overhead, and improving HO reliability. The techniques, methods, apparatuses, and systems disclosed herein may provide such enhancements, as described in more detail below. Such enhancements may be applicable to both intra-frequency and inter-frequency mobility (e.g., HO). In other words, these enhancements may apply to inter-cell mobility (e.g., within and between cell sets) as well as intra-cell key updates (e.g., updating a security key and/or other parameters), among other possibilities.

FIG. 5 is a flow chart diagram illustrating a method for performing cell set based mobility, according to some embodiments. The method of FIG. 5 may provide enhanced mobility, e.g., reduced interruption time, HO overhead and, improved reliability, according to some embodiments. For example, the method of FIG. 5 may enable the UE to minimize or avoid interruption, avoid a HO procedure in the case of a cell change within a serving cell set, and/or avoid connection re-establishment in the case of radio link failure (RLF) occurring within the serving cell set.

In some embodiments, the method of FIG. 5 may enable the network and UE to avoid a HO between different base stations and instead perform a cell change between different cells in a cell set provided by a single base station. UE context may be stored by the base station and shared by some or all cells in the cell set. Thus, resource coordination within the cell set may be performed by the base station and may be relatively simple (e.g., in comparison to a HO procedure between two base stations). Thus, mobility within the cell set may not require any action from the core network, and may be invisible to the core network. In other words, mobility within a cell set may not trigger handover. Handover may be applied only in the scenario of inter-cell set mobility, according to some embodiments. Radio resource management (RRM) measurements may be performed at the cell level and/or cell set level.

In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B and/or BS 102 illustrated in and described with respect to FIGS. 1-4, or more generally in conjunction with any of the computer systems or devices shown in the Figures, among other devices, as desired. Note that while at least some elements of the method of FIG. 5 are described in a manner relating to the use of communication techniques and/or features associated with 3GPP specification documents, such description is not intended to be limiting to the disclosure, and aspects of the method of FIG. 5 may be used in any suitable wireless communication system, as desired. As shown, the method may operate as follows.

A wireless device (e.g., UE 106) may communicate with a first cell (e.g., a serving cell or a camped serving cell), which may be provided by a base station (e.g., BS 102) (510). The UE and the BS may communicate using one or more radio access technologies, e.g., NR.

The first cell may be part of a first cell set (e.g., serving cell set) or may be a stand-alone cell. The first cell set may be configured to provide enhanced mobility within the first cell set. For example, the cell set may share UE context information between any number of (e.g., potentially all) cells in the cell set. Similarly, the cells in the first cell set may share some or all configuration parameters. For example, the network (NW) may configure the first cell set based on measurements (e.g., provided by the UE and/or taken directly by one or more BS) or based on NW deployment details. The configuration of each cell in the first cell set may be common or may be different. Further, the configuration of one or more layers may be common while one or other layers may have different configurations. For example, the L2 and L3 (e.g., Layer 2/3, e.g., data link and network layers, respectively) configuration may be common, while the L1 (e.g., physical layer) configuration may be common or may be different, among various possibilities. The first cell set may be configured in a static manner or may be configured dynamically (e.g., automatically) in response to current conditions, as desired.

The UE may perform data transmission and/or reception with the first cell. Application data and/or control information may be exchanged.

The NW (e.g., via BS 102) may provide configuration information to the wireless device (e.g., UE 106) (520). The configuration information may correspond to the cells of the first cell set, and/or may correspond to one or more other cells (e.g., of one or more other cell sets and/or stand-alone cells). The configuration information may be provided for individual cells and/or for groups of cells. In some embodiments, for sets (or subsets or other groups) of cells, common configuration information may be provided and differences (e.g., delta) for each individual cell may be provided relative to the common configuration. More detail about cell configuration information is provided below with respect to FIGS. 11 and 12.

The wireless device (e.g., UE 106) and/or the NW may monitor the radio link conditions between the UE and the first cell (530). In other words, the NW (e.g., via BS 102) may instruct the wireless device to perform various measurements and/or the BS may perform various measurements associated with the channel/communication between the UE and the first cell. Such instructions may be included in the configuration information (e.g., measurement configuration). Measurements may be cell based (e.g., referred to herein as Model 1) and/or cell set based (e.g., Model 2). The NW and UE may also measure the radio link conditions/channels between the UE and one or more other cells, e.g., potentially including cells in the same set as the first cell, cells in other cell sets provided by the BS 102, and/or one or more other cells provided by other base stations, etc.

Cell based measurements may be taken at the cell level (model 1). For example, a UE may take one or more measurements and compare them to one or more cell level thresholds (which may be configured by the NW and/or UE). The measurements may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), channel state information (CSI), throughput, etc. The thresholds may be or include an S-measure, e.g., a threshold indicating whether or not a HO and/or measurement report should be triggered. A similar threshold(s) may be configured for cell changes within a cell set. Such thresholds may be the same or different than S-measure. For example, in some embodiments, the threshold for cell change may be smaller for cells within the set versus cells outside of the set. In other words, a smaller difference in quality may trigger an intra-set cell change than an inter-set cell change. Measurements of the serving cell (e.g., frequency of the serving cell) may be prioritized. Based on comparison of the measurements to a threshold (e.g., if measured quality is less than a threshold such as S-measure), the UE may be configured to start measuring (e.g., and/or increase the frequency of measurements of) one or more other (e.g., neighbor) cells or cell sets. The UE may provide one or more reports to the network based on the measurements.

Cell set based measurements may be taken at the cell set level (model 2). For example, a UE may take one or more measurements of the cell set and compare them to one or more cell set level thresholds (which may be configured by the NW and/or UE). The measurements may include any radio link measurements. The thresholds may be or include an S-measure, and or similar threshold(s) may be configured for cell changes between cell sets. Such thresholds may be the same or different than S-measure and may be the same or different than thresholds used for individual cells. Measurements of the serving cell set (e.g., frequency of the serving cell set) may be prioritized. A serving cell set's quality may be based on the quality of the camped serving cell (e.g., the first cell set's quality may be the same as the first cell's quality). Based on comparison of the measurements to a threshold (e.g., if measured cell set quality is less than a threshold such as S-measure), the UE may be configured to start measuring (e.g., and/or increase the frequency of measurements of) one or more other (e.g., neighbor) cells or cell sets. A neighbor cell set's quality may be based on the measured quality of one or more cells in the neighbor cell set, e.g., the best or highest quality of any cell in the set. The UE may provide one or more reports to the network based on the measurements. In cell set based measurements, the UE may report the cell ID and/or corresponding cell set ID of some or all of the cells that are measured. The cell ID and linkage of cell set ID and cell ID may be acquired from dedicated or common configuration information, e.g., via RRC.

The measurements may relate to one or more layers. For example, layer 1 (L1, physical layer) and/or higher layer measurements may be included.

The UE may also report measurements and/or information related to factors other than radio link conditions. For example, the UE may provide reports related to its position/location, movement/acceleration, orientation, battery power, application status/activity, upcoming UL and/or DL traffic, accessory devices, other connections (e.g., 802.11, Bluetooth), etc.

In response to the measurements (e.g., of radio link conditions), the NW and or wireless device (e.g., UE 106) may initiate a cell change (540), according to some embodiments. The cell change may be within the first cell set or may be to a cell of a different set or a stand-alone cell. The cell change may be controlled by the NW and/or by the UE. Further detail on various cell change scenarios and procedures according to various embodiments is presented below with respect to FIGS. 6-18.

The UE and/or NW may compare measurements of the camped serving cell (or cell set) to one or more measurements of other cells using various thresholds, and may initiate a cell change in response to the comparison(s). For example, a cell change may be initiated if the difference in quality between the first cell and another cell exceeds a threshold. Inter-cell set cell change thresholds may be different (e.g., higher than) intra-cell set cell change thresholds, among various possibilities.

In some embodiments, a cell change controlled by the UE may be based on measurements, e.g., of the first cell in comparison to one or more other cells. The UE may provide an indication to the NW of the cell change via a target cell, according to some embodiments.

In some embodiments, a cell change controlled by the NW may be based on UE measurement reports. For example, a UE may provide one or more measurement reports (e.g., of L1/L3 measurements, among various possibilities) and/or of its location. The NW may respond with a command, e.g., indicating a target cell. The command may include configuration information of the target cell, e.g., L1, L2, or special configuration such as C-RNTI. The command may or may not be a handover (HO) command, according to various embodiments.

In some embodiments, the cell change may be an interruption-free cell change, e.g., the UE may avoid interruption of communication with the network during the cell change. In other words, the UE may change cells without: RF retuning, without UL or DL synchronization with the target cell, and without resetting a connection, e.g., an L2 connection. Said differently, the UE and the NW may each have the context and configuration information prior to the cell change in order to perform the cell change in a manner that allows the exchange of data to continue during the cell change without interruption for retuning, synchronization, or connection reset activities. Thus, the UE may apply the configuration of the new cell (e.g., second cell) immediately and/or the NW may configure the new/second cell to accept the UE immediately. Thus, the cell change may proceed with only a single message (e.g., an access indication) or potentially with no messages.

The wireless device (e.g., UE 106) may communicate with the network via a second cell (550). The second cell may be in the first set, in a different cell set, or may be a standalone cell.

The UE may continue to transmit or receive data, e.g., without interruption. In other words, the UE may maintain its current connection with the NW during and after the cell change. For example, in the case of RLF for the first cell, the second cell may be within the first cell set and connection reestablishment (e.g., an RRC re-connection procedure) may not be triggered. Instead, the UE may transmit an indication to the NW that it is now operating in the second cell, and may continue data transmission/reception in the second cell.

The UE may continue (e.g., or start) to take measurements of radio link conditions, e.g., of the second cell and/or of other cells. For example, if the second cell is not the same as the first cell, the UE may continue radio link monitoring, e.g., using an L3 procedure.

FIGS. 6-18 and the following additional information are provided as being illustrative of further considerations and possible implementation details relating to the method of FIG. 5 and are not intended to be limiting to the disclosure as a whole. Numerous variations and alternatives to the details provided herein below are possible and should be considered within the scope of the disclosure.

Figure 6:
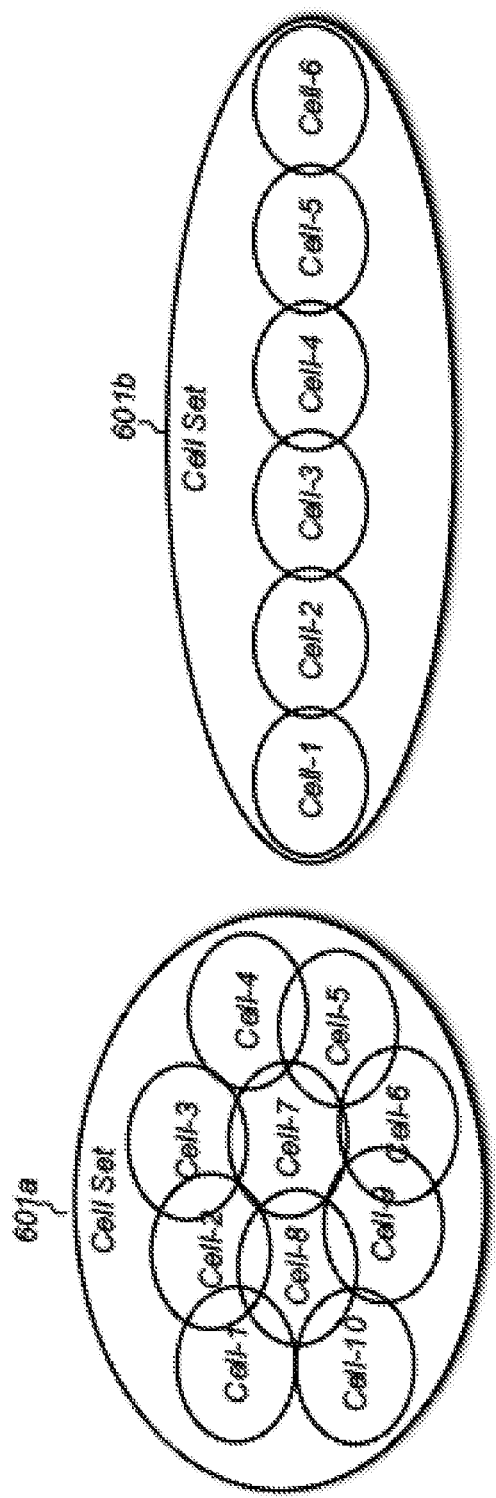
FIG. 6 illustrates exemplary cell sets, according to some embodiments.

FIG. 6—Exemplary Cell Sets

FIG. 6 illustrates two exemplary cell sets, according to some embodiments. Cell sets 601a and 601b may be sets of dense, small cells. As shown, the cell set 601a may include 10 cells (cell-1 through cell-10) and cell set 601b may include six cells (cell-1 through cell-6). Note that the number of cells and the geometric arrangement of the cells are exemplary only. Other numbers of cells and other arrangements (e.g., squares, hexagons, etc.) of cells are possible.

The cells in either of the cell sets 601 may be provided by one or more base stations, e.g., BS 102, according to some embodiments. The cells may be configured to communicate with wireless devices, e.g., UE 106, via one or more communication technologies, such as NR. The cells in the cell sets 601 may be configured based on NW deployment and/or based on measurements of the radio link environment (e.g., channel conditions) with UE 106. For example, the configuration of the cells within either cell set 601 may be designed and/or changed in real time in response to changing network/channel conditions, and the (e.g., changed) configuration may be provided to the UE 106. The configuration information may be provided in any format. For example, the configuration information may be provided by RRC.

Figure 7:
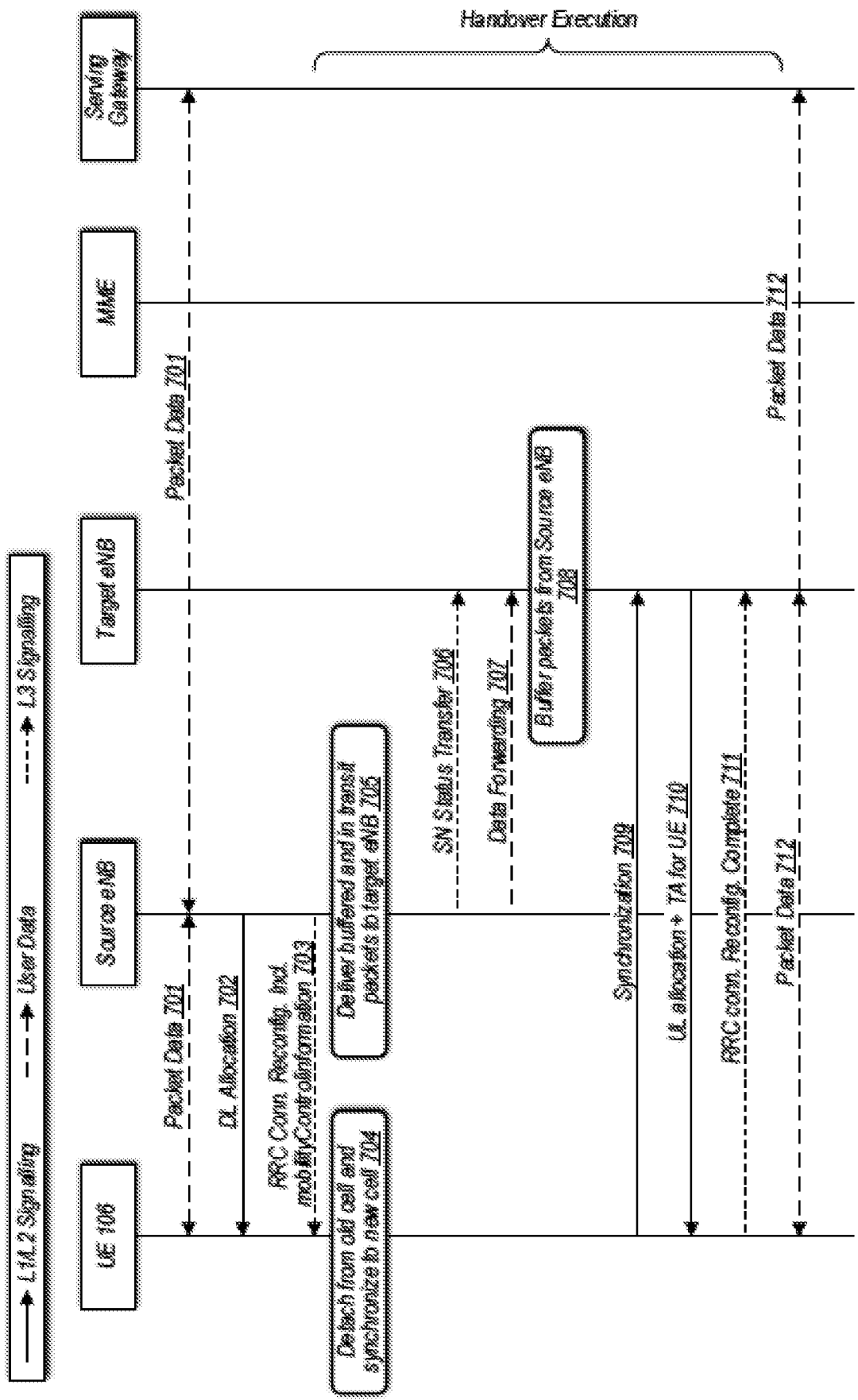
FIGS. 7-8 illustrate handover message flow and potential interruption time, according to some embodiments.
Figure 8:
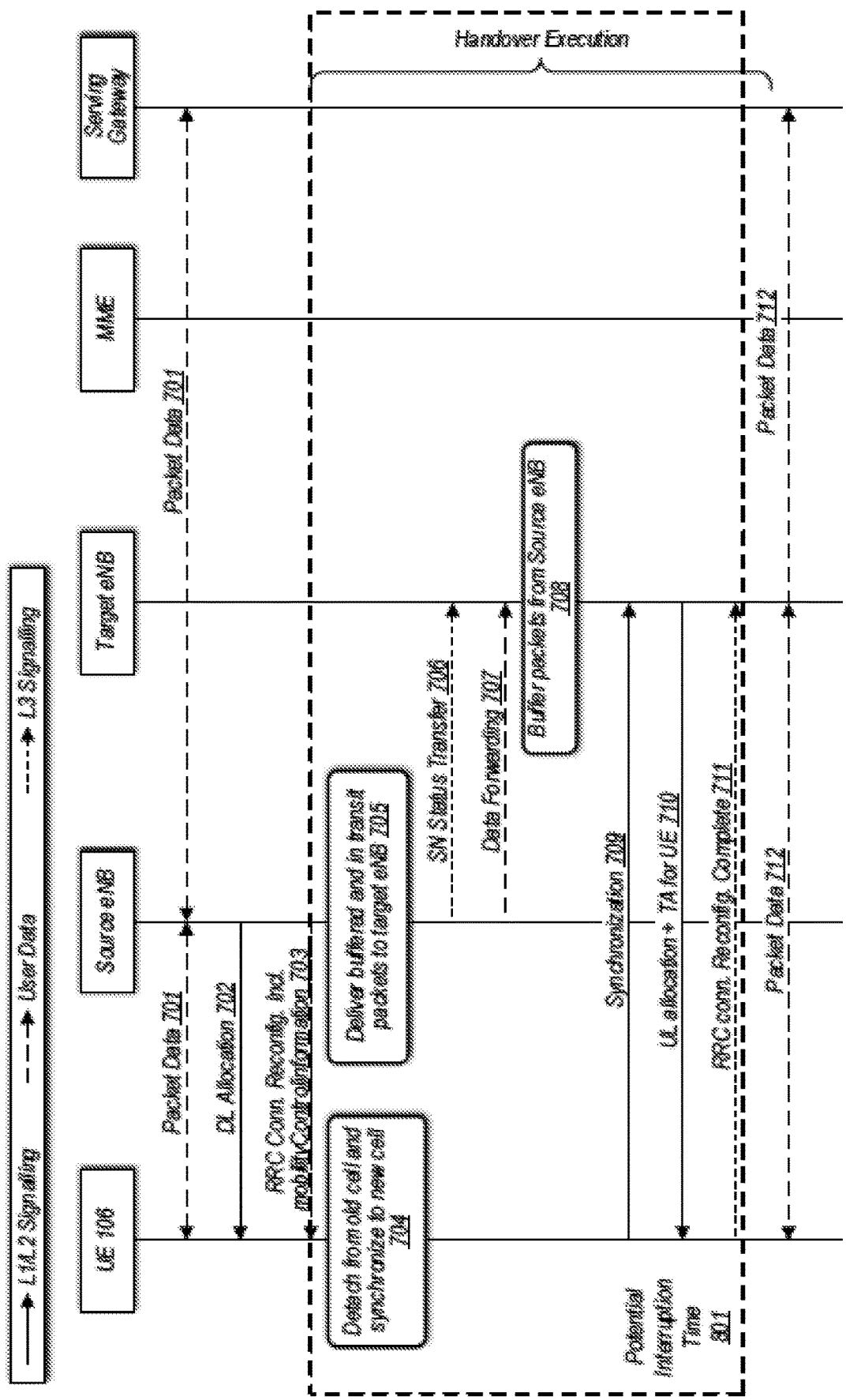

FIGS. 7-8—Exemplary Handover (HO) Scheme and Interruption Time

FIG. 7 is a communication flow diagram, illustrating an exemplary HO procedure, according to some embodiments. Data may be exchanged between a UE 106, a first BS 102 (e.g., Source eNB), and a serving gateway (701). The data may include user or packet data associated with one or more applications executing on UE 106. The NW may provide a DL allocation to the UE 106 (702). The NW may provide a handover (HO) command (703), which may be an RRC connection reconfiguration message and may include mobility control information (e.g., identifying a target eNB (e.g., a different BS 102). In response to the HO command, the UE may detach from the first (old) cell and synchronize with a second (new) cell (704). Correspondingly, the source eNB may provide buffered and in transit packets to the target eNB (705). This delivery may include providing a service node (SN) status transfer message (706) and forwarding data (707) to the target eNB. The target eNB may then buffer the packets received from the source eNB (708). The UE 106 may synchronize with the target eNB (709). The target eNB may provide a UL allocation and tracking area (TA) to the UE (710). The target eNB may provide an indication that the HO is complete to the UE, which may include an RRC connection reconfiguration complete message (711). The UE may resume exchanging user data with the network via the target eNB and the serving gateway (712).

In some embodiments, the HO procedure of FIG. 7 may include resetting the RLC and MAC connections of the UE 106. The PDCP connection may also be re-established in some HO scenarios and embodiments (e.g., as in LTE), but may be maintained (e.g., without re-establishment, e.g., as in NR) in other HO scenarios and embodiments.

FIG. 8 illustrates the same communication flow as shown in FIG. 7. However, FIG. 8 highlights the potential interruption time (801) associated with HO execution. Notably this time begins with the HO command (703) and ends with the HO complete message (711). In some embodiments, no user data may be exchanged between the UE 106 and the NW during this potential interruption time. This potential interruption time may include time for the following activities: RF retuning, DL synchronization with the target cell (e.g., target eNB), L2 reset (e.g., a random access procedure to reset the RLC, MAC, and/or PDCP connections), and UL synchronization with the target cell. In some embodiments, the techniques described herein may allow a UE 106 to avoid or minimize this potential interruption time.

Figure 9:
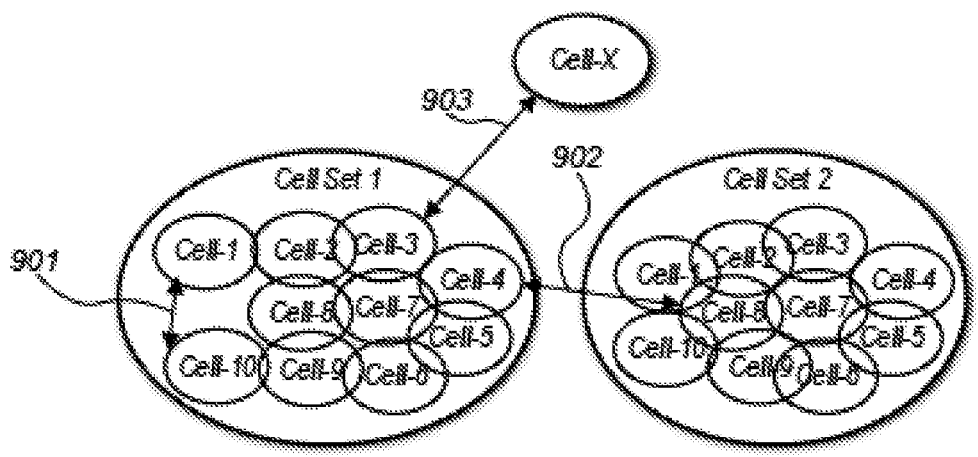
FIG. 9 illustrates an exemplary group of cells and exemplary cell change possibilities, according to some embodiments.

FIG. 9—Exemplary Group of Cells and Cell Changes Possibilities

FIG. 9 illustrates an exemplary group of cells and possible cell changes between various cells. As shown, the group of cells includes cell set 1 (with ten cells), cell set 2 (with ten cells different from those in cell set 1), and a stand-alone cell (cell-X).

Within a serving cell set, cells may be categorized as two types. A camped serving cell may be the serving cell, e.g., a cell that UE stays in and performs data transmission/reception with. A candidate serving cell may be a serving cell within the serving cell set other than the camped serving cell.

Various cell change possibilities exist for UEs connected to a cell within this group. For example, a UE connected to a cell in cell set 1 may change to a different cell within that cell set (901). This may be viewed as a cell type change, e.g., one of the candidate serving cells becomes a camped serving cell. Such a cell type change may be in response to measurements of the camped serving cell and/or candidate serving cells. Such a change may be made under NW control or under UE control, according to some embodiments.

Further, a cell may change from a cell in one cell set to a cell in a different cell set (902). This may be viewed as mobility across serving cell sets. In some embodiments, a HO procedure may be applied. A handover command may include a target serving cell set identity and/or configuration, and may further include a specific target serving cell identity and/or configuration.

Further, a cell may change between a cell of a cell set and a stand-alone cell (903) or vice versa. In some embodiments, a HO procedure may be applied. A handover command may include a target serving cell set identity and/or configuration, and may further include a specific target serving cell identity and/or configuration. In the case of a change to the stand-alone cell, the HO command may include the identity and/or configuration of the target cell.

Note that the exemplary sets, cells, numbers of cells, and spatial arrangement of the cells/cell sets are for illustrative purposes only, and that other arrangements and numbers of cells are possible. Similarly, note that the illustrated cell changes are exemplary only and that other cell changes are possible.

Figure 10:
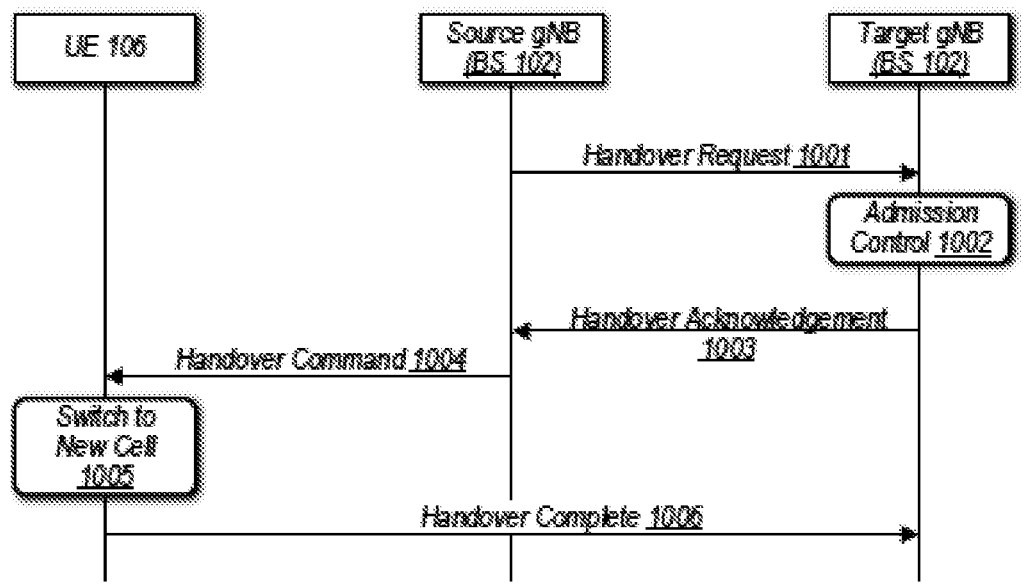
FIG. 10 illustrates an exemplary handover procedure, according to some embodiments.

FIG. 10—Exemplary Network Initiated Handover Procedure

FIG. 10 illustrates a handover procedure controlled by the network. In some embodiments, the source gNB and the target gNB may not be the same, e.g., the handover may be between two cells that are not in a single cell set provided by a single BS 102.

As shown, a source gNB (e.g., BS 102) may transmit a HO request to a target gNB (e.g., BS 102) or to a NW function responsible for controlling handover (1001). The HO request may be in response to one or more measurements taken by the source gNB and/or one or more measurement reports from a UE 106. The HO request may additionally or alternatively be in response to other factors including load at one or both of the base stations or other network elements, network deployment, motion of the UE, etc. In response to the HO request, the target gNB may perform an admission control process (1002), and may determine to accept handover. In some embodiments, the target gNB may further select a specific cell, e.g., within a cell set provided by the target gNB to receive the UE 106. The target gNB may provide an HO acknowledgement to the source gNB (1003). The HO acknowledgement may specify various parameters for the HO, including the identity of the target cell. In some embodiments, the HO acknowledgement may not specify a target cell. The source gNB may, in response to the HO acknowledgement, provide an HO command to the UE 106 (1004). The HO command may specify the target serving cell set, and may further specify the target serving cell. In response to the HO command, the UE 106 may switch to a new cell (1005). If the HO command specifies a target serving cell, the UE 106 may switch to that target serving cell. If the HO command does not specify a target serving cell, the UE 106 may select a target serving cell. For example, the UE 106 may select a target serving cell based on one or more measurements. The UE 106 may further use any configuration information that it is aware of (e.g., as discussed above with respect to 520) to select a target serving cell and/or to synchronize with a target serving cell. The UE 106 may provide a handover complete message to the target BS 102 via the target serving cell (1006). The HO complete message may inform the NW that the UE 106 is now camped on the new cell. The UE and NW may proceed to exchange user data, control information, etc. via the new cell.

Figure 11:
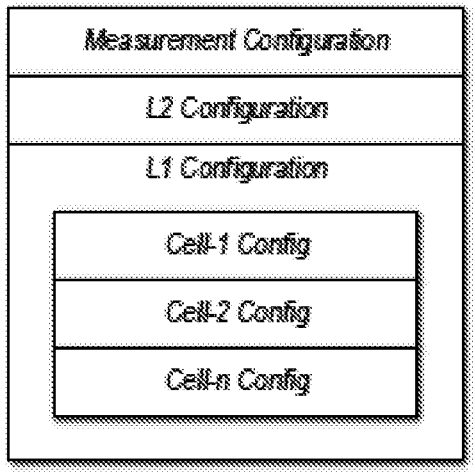
FIGS. 11-12 illustrate exemplary configuration information, according to some embodiments.
Figure 12:
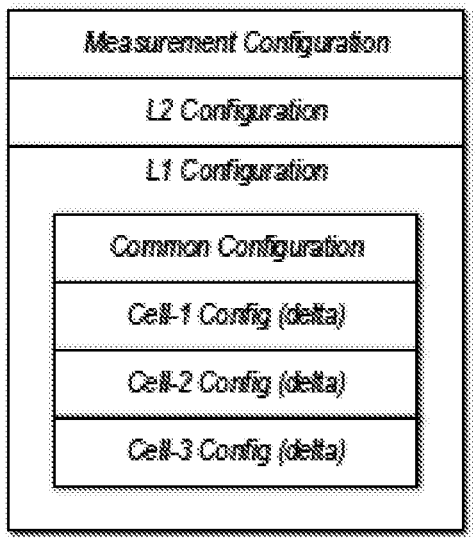

FIGS. 11-12—Configuration Information

FIGS. 11 and 12 illustrate exemplary configuration information, according to some embodiments. The configuration information may be provided by a NW to a wireless device (e.g., UE 106), and may apply to one or more cells. For example, the configuration information may apply to a current serving cell and/or one or more candidate serving cells. The configuration information may apply to one or more cell sets. The configuration information may include some configurations that are common to multiple (e.g., some or all) of the cells to which the configuration applies and/or some configurations that apply to only individual cells or cell sets. The configuration information may be provided via RRC.

The configuration information may specify configurations for radio communication between a UE and a cell (e.g., a BS 102). For example, the configuration information may specify time and frequency resources for communication, e.g., for uplink/downlink transmissions, random access procedures, control information, etc. For example, time and/or frequency resources of one or more channels (e.g., PDCCH, PDSCH, PUCCH, PUSCH, etc.) may be specified. Resource allocations may be provided to one or more UEs.

The configuration may apply to one or more layers. For example, L1, L2, and/or L3 parameters may be specified. L2 parameters may include: SDAP, PDCP, RLC, MAC parameters, among various possibilities. Common SDAP/PDCP/RLC configurations may be used across cells within the cell set, and MAC configurations may be provided as common information with delta configuration. For example, a UE and/or the NW may provide common DRX configuration, RACH parameters, PHR configuration, BSR configuration, etc. For each cell within the cell set, if the MAC configuration (e.g., an SPS configuration) is different than a common part, then the MAC/SPS configuration may be provided individually and/or through delta information. For L2 parameters, delta configuration may be applied on PUCCH, PUSCH, PRACH, etc.

The configuration information may include measurement configuration, which may specify any of various parameters, including the timing, triggers, thresholds, and/or types of various measurements for a UE (e.g., UE 106) to perform. The measurement configuration may further include format and/or timing for the UE to use to report measurement results. For example, hysteresis values may be specified.

The configuration information may include measurement configurations of one or more layers, e.g., L1 and/or L2. Such configuration information may be common to multiple cells or unique to individual cells (or cell sets or other groups). The measurement configuration may include parameters for monitoring radio link conditions at various levels, including cell level and/or cell set level measurements.

In some embodiments, the configuration may include cell ID information, including linkages between cell set ID and cell ID, e.g., for use in signaling structure design. The use of such ID information may reduce signaling overhead. For example, L2 components of cell set ID/cell ID may be provided in a common/delta format. Further, the cell set ID may not be included in (e.g., at least some) signaling, however the UE may infer the special configuration parameter and/or cell set ID is common configuration.

The configuration information may be transmitted in a compressed format, e.g., using one or more configuration index.

In the example illustrated in FIG. 11, the L2 configuration may be common to all cells for which the configuration information is applicable. However, the L1 configuration information may be cell specific. Thus, as shown, individual L1 configurations may be provided for each of the cells (e.g., cell-1 through cell-n).

In the example illustrated in FIG. 12, the L2 configuration may be common to all cells for which the configuration information is applicable. However, the L1 configuration information may include common configuration information and cell specific configuration information. For each cell, the difference between the common configuration information and the cell specific configuration may be referred to as delta. The delta may identify one or more configuration parameters and the difference in value for the individual cell relative to the common configuration. Thus, as shown, common L1 configuration information may be provided as well as cell specific delta information for each of the cells (e.g., cell-1 through cell-n). The use of configuration delta information may allow the NW to reduce the size (e.g., number of bits) necessary to provide the configuration information, e.g., relative to providing the configuration information directly for each cell.

In some embodiments, another exemplary signaling structure may include: common L3 configuration, different L2 configuration (or common L2 configuration+delta configuration for some/all cells), and different L1 configuration (or common L1 configuration+delta configuration for some/all cells). Other combinations of configurations and/or signaling structures are possible.

FIGS. 13-18—Cell Change Procedures

FIGS. 13-18 provide illustrations of various exemplary cell changes and cell change procedures. Note that the illustrated examples are exemplary only and that other cell changes and procedures are possible.

Figure 13:
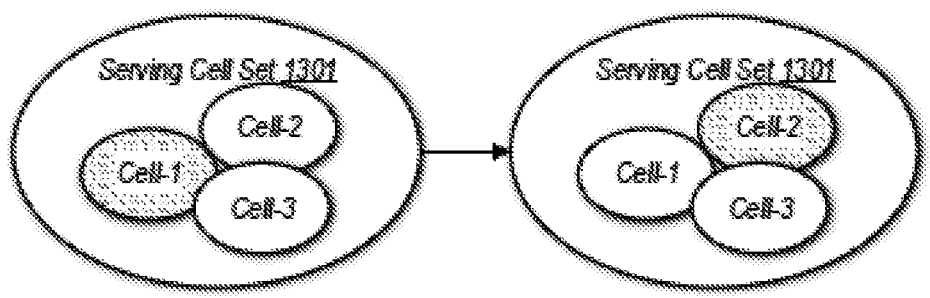
FIGS. 13-18 illustrate exemplary cell change scenarios and procedures, according to some embodiments.

FIG. 13 illustrates an example of a cell change within the same serving cell set 1301, which includes at least illustrated cells 1-3. Cell set 1301 may be provided by a BS 102. As shown, a UE 106 may change from cell-1 to cell-2 within the serving cell set 1301. This may be done under UE control or under NW control, according to some embodiments.

Figure 14:
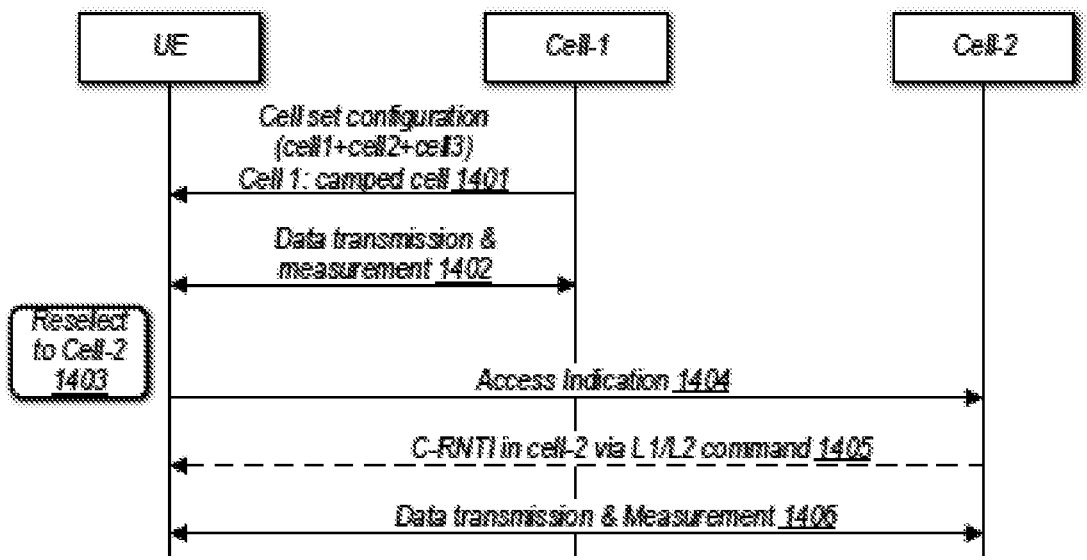

FIG. 14 is a communication flow diagram illustrating the cell change of FIG. 13, with the cell change performed under UE control. The BS 102 may (via cell 1) provide configuration information for all cells in the cell set 1301 (1401), e.g., as described above with respect to 520. The configuration information may include configuring the UE 106 on cell-1 and may include unique configuration parameters of cell-1. The configuration information may further include configuration information for additional cells and/or cell sets. The UE and the BS may perform data transmission and measurement (1402), e.g., as described above with respect to 510 and 530. Based on the measurements, the UE 106 may reselect to cell-2 (1403). The determination may utilize a cell reselection like mechanism (e.g., under UE control) and/or may be based on a NW determination. For example, the UE 106 may determine that candidate serving cell-2 has better radio link conditions than camped serving cell 1 by at least an offset (e.g., a threshold as configured in measurement configuration for intra-cell set cell change usage) amount, and as a result may determine to reselect (e.g., similar to an A3 event in LTE). Similarly, the reselection may be based on comparisons similar to one or more of A1-A6 in LTE, among various possibilities. Note that, as described above, the NW may configure the measurement events (e.g., timing, thresholds, etc.). The reselection may further be in response to configuration information, motion of the UE, etc. Based on the determination, the UE 106 may begin using cell-2, e.g., immediately, e.g., based on its knowledge of the configuration of cell-2 from the configuration information. Accordingly, UE 106 may not (e.g., may not need to) synchronize with cell-2, re-establish any connections, or retune RF circuitry in order to reselect. In other words, the UE 106 may avoid synchronization, re-establishing connections and retuning in the cell change process. In other words, the communication between the NW and the UE 106 may continue without interruption, e.g., continuously. Similarly, the NW may maintain context information for the UE during the cell change. Thus, the UE 106 may transmit an access indication to the NW, via cell-2 in order to inform the NW of the reselection to cell-2 (1404). In some embodiments, an access indication may not be transmitted and the cell change may occur without any handover-specific messages. For example, if the UE is engaged in an active transmission at the time of the cell change, it may continue the transmission in cell-2. The transmission in cell-2 may alert the NW that the UE has changed to cell-2, and no explicit indication may be used. The access indication may be transmitted immediately following (e.g., in response to) the cell change and/or may be transmitted with another message, e.g., when the UE has UL data for transmission. In some embodiments, the UE may not transmit an indication even if it is not engaged in an active transmission and may stay silent during the cell change. In response to the cell change (e.g., access indication), the NW may transmit any dedicated (e.g., new or special) configuration information to the UE via cell-2 (1405). For example, the NW may transmit a cell radio network temporary identity (C-RNTI) to the UE via an L1 and/or L2 command. Such dedicated configuration information may be limited in size. The dedicated configuration information may include any cell specific parameters which are different than the common configuration information. The configuration information may be transmitted in a compressed format, e.g., using a configuration index. The UE and NW may continue to exchange data and measurements via cell 2 (1406).

In other words, for a cell change under UE control, the NW may configure measurement conditions and, in response to the UE detecting that a second cell meets the conditions (e.g., for quality) the UE may change to the second cell (e.g., without explicit signaling) and may access the other cell directly. Relative to a typical HO procedure, this procedure may reduce the signaling overhead during HO procedure, e.g. the following may be avoided: measurement report, cell change/HO command, and new cell configuration to NW during cell change procedure. Further, this procedure may reduce or eliminate the interruption time, e.g., the UE may directly transmit data to the target cell without RACH/sync procedure, may avoid reestablishing L2, and/or may avoid the buffer/data flush operation.

Similarly, for a cell change under NW control, when the UE detects that a measurement condition (e.g., as configured by the NW) is met, the UE may send a measurement report (e.g., including a target cell ID) to the NW, and the NW may send a cell change command to the UE (e.g., including a target cell ID). Relative to a typical HO procedure, this procedure may reduce the signaling overhead during HO procedure, e.g. a new cell configuration to NW during cell change procedure may be avoided. Further, a cell change command may be transmitted in L1/L2, e.g., instead of in L3, according to some embodiments. Further, this procedure may reduce or eliminate the interruption time, e.g., the UE may directly transmit data to the target cell without RACH/sync procedure and/or the UE may avoid reestablishing L2, and/or may avoid the buffer/data flush operation.

In various embodiments, some of the elements of the methods shown in FIG. 14 may be performed concurrently, in a different order than shown, may be substituted for by other method elements, or may be omitted. Additional method elements may also be performed as desired. For example, in some embodiments, elements 1404 and 1405 may be omitted, e.g., if there is no configuration difference between cell-1 and cell-2.

Figure 15:
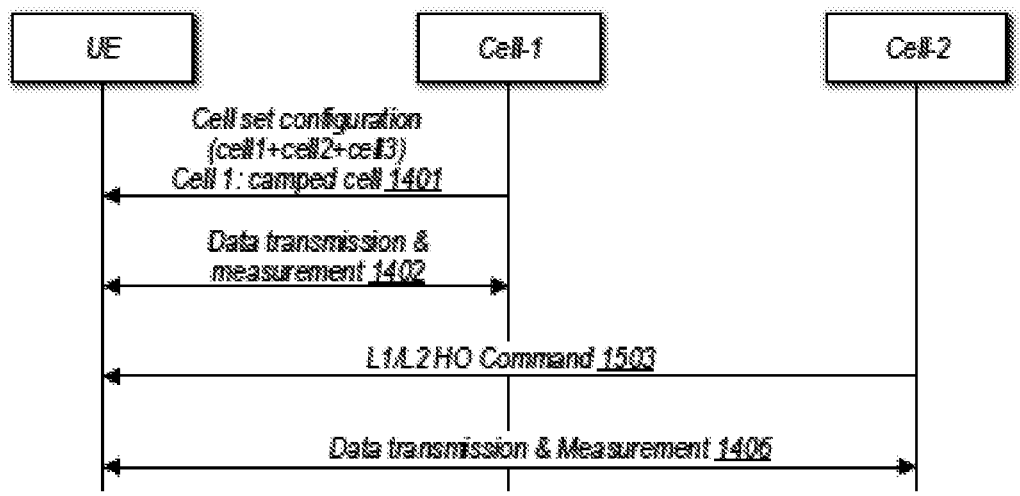

FIG. 15 is a communication flow diagram illustrating the cell change of FIG. 13, with the cell change performed under NW control. The BS 102 may (via cell 1) provide configuration information for all cells in the cell set 1301 (1401), e.g., as described above with respect to 520. The configuration information may include configuring the UE 106 on cell-1 and may include unique configuration parameters of cell-1. The UE and the BS may perform data transmission and measurement (1402), e.g., as described above with respect to 510 and 530. The NW may determine (e.g., based on measurements, motion of the UE, etc.) to cause a cell change and may provide a cell change command to the UE (1503). In the illustrated example, the NW may provide the command via cell-2, however the NW may also (e.g., additionally or alternatively) provide the command via cell-1, according to some embodiments. In some embodiments, the command may specify a target cell (e.g., cell-2). In other embodiments, the command may not specify a target cell and the UE may select a target cell (e.g., cell-2), e.g., based on the previous measurements and/or based on additional measurements, etc. The command may further include configuration information, e.g., for a target cell and/or one or more candidate cells. The UE and NW may continue to exchange data and measurements via cell 2 (1406). The NW may maintain context information for the UE during the cell change, the UE may have the configuration information for the target cell (e.g., from 1401 and/or 1503), and interruption to communication may be avoided.

Figure 16:
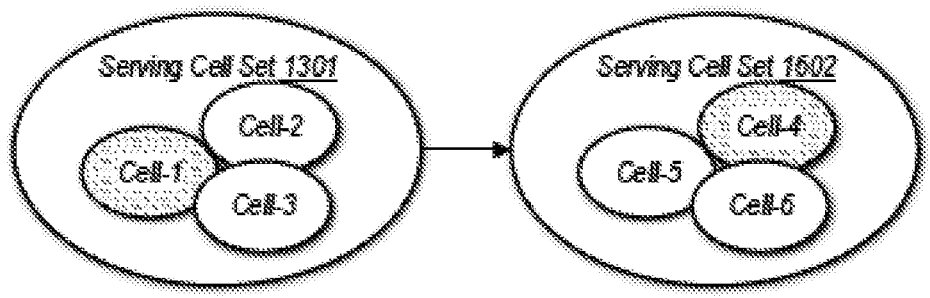

FIG. 16 illustrates an example of a cell change from serving cell set 1301, which includes at least illustrated cells 1-3 to cell set 1602, which includes at least cells 4-6. Cell set 1301 may be provided by a BS 102. Cell set 1602 may be provided by a BS 102, which may be the same or different than the BS 102 providing cell set 1301. As shown, a UE 106 may change from cell-1 to cell-4. This may be done under UE control or under NW control, according to some embodiments.

Figure 17:
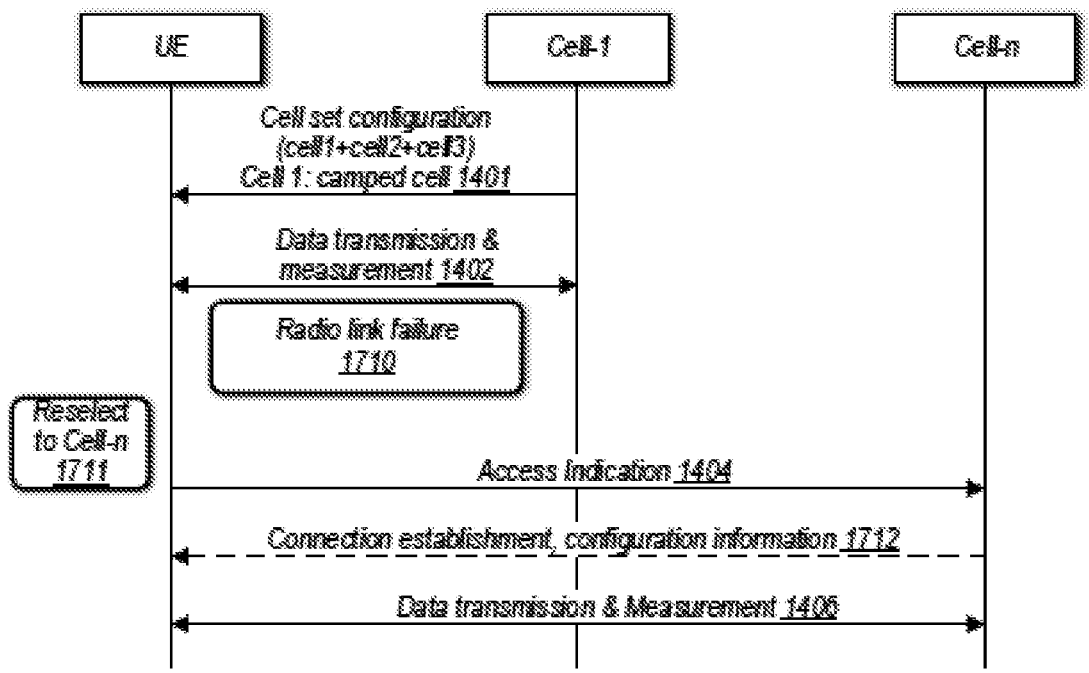

FIG. 17 is a communication flow diagram illustrating a cell change due to radio link failure. The cell change may be within the same cell set as illustrated in FIG. 13 or between cell sets as illustrated in FIG. 16. The BS 102 may (via cell 1) provide configuration information for all cells in the cell set 1301 (1401), e.g., as described above with respect to 520. The configuration information may include configuring the UE 106 on cell-1 and may include unique configuration parameters of cell-1. The configuration information may further include configuration information for additional cells and/or cell sets, e.g., cell set 1602. The UE and the BS may perform data transmission and measurement (1402), e.g., as described above with respect to 510 and 530. A radio link failure may occur between the UE and cell-1 (1710). The UE and/or NW may detect the radio link failure based on the measurements (e.g., radio link monitoring). In response to detecting the radio link failure, the UE may perform cell selection and reselect to cell-n (1711). Cell-n may be in the same cell set (e.g., cell-2 of cell set 1301) or may be in a different cell set (e.g., cell-4 of cell set 1602). In the case that cell-n is in the serving cell set (e.g., cell-2 of cell set 1301), the UE may apply the configuration of cell-2, and may transmit an access indication in cell-2 (1404), as described above. In the case that cell-n is in a different cell set (e.g., cell-4 of cell set 1602), the UE may perform a connection re-establishment procedure, according to some embodiments. If the UE already has configuration information for cell-4 (e.g., from 1401), the UE may apply the configuration and connection reestablishment may be avoided or expedited. The UE may transmit an access indication in cell-4 (1404), as described above. In response to the access indication, the NW may provide (via cell-2 or cell-4), any necessary information to proceed with the connection in the new serving cell (e.g., cell 2 or cell 4) (1712). For example, new configuration information may be provided in an connection re-establishment message. The configuration information may include configuration parameters for the new serving cell, and any associated cell sets or other cells. The configuration information may be provided as delta configuration information, e.g., indicating any differences between the configuration of the new serving cell and the old serving cell (e.g., cell 1). Further, the configuration information may include C-RNTI or other information. The configuration information may be provided via an L1 and/or L2 command. The UE and NW may continue to exchange data and measurements via the new serving cell (e.g., 2 or 4) (1406), as described above.

Figure 18:
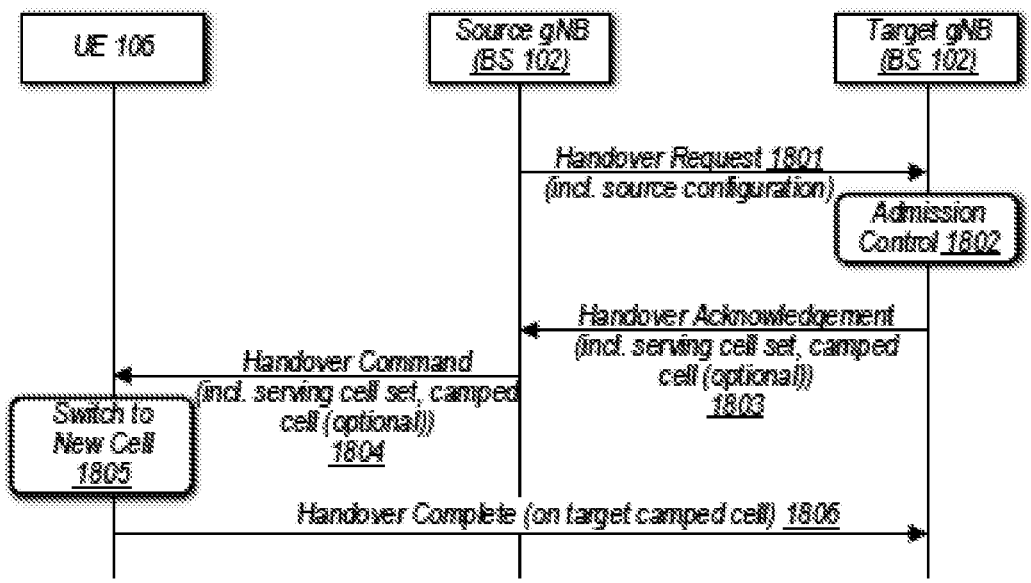

FIG. 18 is a communication flow diagram illustrating the cell change of FIG. 16 (e.g., between cell sets), with the cell change performed under NW control. As shown, a source gNB (e.g., BS 102) may transmit an HO request to a target gNB (e.g., BS 102) or to a NW function responsible for controlling handover (1801). The HO request may be in response to one or more measurements taken by the source gNB and/or one or more measurement reports from a UE 106. The HO request may additionally or alternatively be in response to other factors including load at one or both of the base stations or other network elements, network deployment, motion of the UE, etc. The HO request may include configuration of the camped serving cell (e.g., cell-1) and/or configuration of the serving cell set (e.g., set 1301). In response to the HO request, the target gNB may perform an admission control process (1802), and may determine to accept handover. In some embodiments, the target gNB (e.g., or the NW) may further select a specific cell, e.g., cell-4 to receive the UE 106. Such a selection may be based at least in part on the source configuration information. The admission control process may be expedited and/or avoided, e.g., in the case that the NW is able to retain UE context information related to the connection with cell-1, e.g., based on the source configuration. The target gNB may provide an HO acknowledgement to the source gNB (1803). The HO acknowledgement may specify various parameters for the HO, including the identity and/or configuration of the target cell and/or target cell set. For example, the HO acknowledgement may further include configuration information for the new serving cell set (e.g., 1602) and/or new serving cell (e.g., cell-4). In some embodiments, the target gNB may configure the target cell and/or target cell set based at least in part on the source configuration, e.g., in order to expedite handover, e.g., by using the same or similar configuration parameters. In some embodiments, the HO acknowledgement may not specify a target cell. The source gNB may, in response to the HO acknowledgement, provide an HO command to the UE 106 (1804). The HO command may specify the target serving cell set, and may further specify the target serving cell. Similarly, the HO command may include configuration information for the target cell set and/or cell. In response to the HO command, the UE 106 may switch to a new cell, e.g., cell-4 (1805). If the HO command specifies a target serving cell, the UE 106 may switch to that target serving cell. If the HO command does not specify a target serving cell, the UE 106 may select a target serving cell. For example, the UE 106 may select a target serving cell based on one or more measurements. The UE 106 may further use any configuration information that it is aware of (e.g., as discussed above with respect to 520 and/or 1804, etc.) to select a target serving cell and/or to synchronize with a target serving cell. The UE 106 may provide a handover complete message to the target BS 102 via cell-4 (1806). The HO complete message may inform the NW that the UE 106 is now camped on the new cell. The UE and NW may proceed to exchange user data, control information, etc. via the new cell.

Cell Level Measurement

In some embodiments, there may be at least three types of cell level measurement: camped cell measurement, intra-cell set measurement, and inter-cell set measurement, among various possibilities.

In camped cell measurement, the UE 106 and/or BS 102 may take measurements of the radio link conditions with a camped serving cell. Such measurements may be taken as specified by the NW, e.g., using measurement schedules, measurement triggers, threshold values, and other parameters provided by the NW and/or may be taken as determined by the UE.

In intra-cell set measurement, the UE 106 and/or BS 102 may take measurements of the radio link conditions with one or more candidate serving cells within the camped serving cell set. Such measurements may be taken as specified by the NW, e.g., using measurement schedules, measurement triggers, threshold values, and other parameters provided by the NW and/or may be taken as determined by the UE. For example, measurements of candidate serving cells may be started (e.g., or taken more frequently, more quickly, etc.) in response to measurements of the camped serving cell quality falling below a threshold, e.g., S-measure. Similarly, the differences between measurements of the camped serving cell and one or more candidate serving cells may be compared using one or more thresholds/offsets.

In inter-cell set measurement, the UE 106 and/or BS 102 may take measurements of the radio link conditions with one or more candidate serving cells outside of the camped serving cell set. Such measurements may be taken as specified by the NW, e.g., using measurement schedules, measurement triggers, threshold values, and other parameters provided by the NW and/or may be taken as determined by the UE. For example, measurements of cells outside of the serving cell set may be started (e.g., or taken more frequently, more quickly, etc.) in response to measurements of the camped serving cell quality falling below a threshold, e.g., S-measure. The threshold(s) used to initiate or increase inter-cell set measurements may be different than the threshold(s) used for intra-cell set measurements. In other words, inter-cell set measurement thresholds may be different (e.g., higher than) intra-cell set measurement thresholds. Further, inter-cell set measurements may be taken or increased in response to intra-cell set measurements. For example, inter-cell set measurements may be initiated in response to camped serving cell quality falling below a first threshold and the quality of a highest quality cell in the serving cell set falling below a second threshold.

In some embodiments, both inter-cell set and intra-cell set measurements may be taken. For example, differences between a first camped serving cell and one or more second candidate serving cells within the cell set may be compared using a first threshold. In response to that first comparison, differences between the camped serving cell and one or more third candidate serving cells outside of the cell set may be compared using a second threshold. Additionally or alternatively, in response to that first comparison, values of one or more third candidate serving cells outside of the cell set may be compared to a third threshold. In other words, in some embodiments, some comparisons and thresholds may be relative, e.g., comparing measurements of one cell to another (e.g., similar to A3/A5/A6), while other comparisons and thresholds may be absolute (e.g., similar to A4), e.g., comparing measurements of a cell to an absolute value. Such absolute and relative measurements/comparisons may be combined in any of various ways. Cell change determinations may be based on a combination of the comparisons/measurements.

Similarly, there may also be various types of cell set level measurements, according to some embodiments. Cell set measurements may be based on the measurements of one or more cells in a cell set. For example, cell set measurements may be based on measurements of a best (e.g., highest quality) cell in a cell set, e.g., either including or excluding a camped serving cell. Alternatively, cell set measurements may be based on average or median (e.g., or other percentile) values of measurements of cells within the cell set.

In some embodiments, measurements may assume one cell set only in one frequency. This configuration may simplify measurements for the UE and reduce power consumption for measurement (e.g., because to measure the cell set, the UE only measures one frequency. However, in other embodiments, a cell set may use any number of frequencies or frequency ranges.

A UE may provide reports of measurements to a NW, e.g., for any type(s) of measurements. For example, a UE may provide set based measurement reports.

The different types of measurements may be prioritized. For example, camped serving cell measurements may be higher priority than intra-cell set measurements, which may be higher priority than inter-cell set measurements. Other priority orders may be used and/or the priority order may be adjusted based on other factors (e.g., motion of the UE, load at NW elements or BS 102s, etc.).

In some embodiments, measurement events (e.g., of cell level measurements and/or cell set level measurements) may be triggers for cell changes and/or additional measurements. For example, events similar to A3 may be used to trigger inter-cell set or intra-cell set cell changes. In other words, if a target/candidate cell (e.g., within the serving cell set or otherwise), exceeds the quality of the camped serving cell by a threshold (e.g., XdB, which may depend on whether the candidate cell is within or outside the serving cell set), a cell change may be triggered. Similarly, an exemplary event that may trigger inter set cell change may be that a neighbor cell (e.g., not within the serving cell set) may exceed the quality of the current camped cell by a second threshold (e.g., YdB). Additional or different trigger conditions may be configured as desired, e.g., including thresholds for the current cell, cells in the serving cell set, cells outside the serving cell set, rates of change for the quality of various cells, differences between the quality of various cells, duration of (e.g., differences between) the quality of various cells relative to other thresholds, etc. Similarly, events with definitions similar to A1-A6 events in LTE may be used. Such definitions may be adapted to cell set level measurements.

Additional Information

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a network device (e.g., a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The network device may be realized in any of various forms.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment device (UE) to:
establish a connection with a first cell of a cellular network, wherein the first cell belongs to a first cell set configured by the cellular network;
receive, via the first cell, measurement instructions and configuration information from the cellular network at a first time, wherein the configuration information comprises at least configuration of a second cell, wherein the second cell belongs to a second cell set configured by the cellular network and distinct and separate from the first cell set;
perform at least one measurement of the second cell based on the measurement instructions;
determine that a measurement event has been triggered based on the at least one measurement of the second cell;
determine to perform a cell change to the second cell at a second time, wherein the determination to perform the cell change is in response to the measurement event;
communicate an access indication to the second cell in response to the determination to perform the cell change; and
transmit data to the second cell without reestablishing layer 2 (L2).

2. The apparatus of claim 1, wherein the processing is further configured to cause the UE to:
report the at least one measurement to the cellular network.

3. The apparatus of claim 1, wherein the processor is further configured to cause the UE to:
perform at least one additional measurement of at least one cell other than the first cell; and
select a target cell based on the at least one additional measurement, wherein the second cell is selected as the target cell.

4. The apparatus of claim 1, wherein the processor is further configured to cause the UE to:
receive dedicated configuration information in response to the access indication.

5. The apparatus of claim 1,
wherein a first cell set comprises a third cell,
wherein the processor is further configured to cause the UE to:
perform at least one measurement of the third cell;
perform a first comparison of the at least one measurement of the third cell using a first threshold; and
perform a second comparison of the at least one measurement of the second cell using a second threshold, wherein the first and second thresholds are different, wherein the first threshold is an intra-cell set cell change threshold and the second threshold is an inter-cell set cell change threshold, wherein the cell change is in response to the first and second comparisons.

6. The apparatus of claim 1, wherein to perform the cell change, the processor is further configured to cause the UE to:
apply the configuration of the second cell.

7. The apparatus of claim 6, wherein the processor is further configured to cause the UE to:
receive dedicated configuration information in response to the access indication.

8. The apparatus of claim 7, wherein the dedicated configuration information includes a cell radio network temporary identity (C-RNTI).

9. The apparatus of claim 1, wherein the processor is further configured to cause the UE to transmit data to the second cell without a random access channel (RACH) procedure.

10. The apparatus of claim 1, wherein the processor is further configured to cause the UE to transmit data to the second cell without flushing a data buffer.

11. A user equipment device (UE) comprising:
a radio; and
a processor operably coupled to the radio and configured to cause the UE to:
establish connection with a first cell of a cellular network, wherein the first cell belongs to a first cell set configured by the cellular network;
receive, via the first cell, measurement instructions and configuration information from the cellular network at a first time, wherein the configuration information comprises at least configuration of a second cell, wherein the second cell belongs to a second cell set configured by the cellular network and distinct and separate from the first cell set;
perform at least one measurement of the second cell based on the measurement instructions;
determine that a measurement event has been triggered based on the at least one measurement of the second cell;
determine to perform a cell change to the second cell at a second time, wherein the determination to perform the cell change is in response to the measurement event;
communicate an access indication to the second cell in response to the determination to perform the cell change; and transmit data to the second cell without reestablishing layer 2 (L2).

12. The UE of claim 11, wherein the processor is further configured to cause the UE to:
   perform at least one additional measurement of at least one cell other than the first cell; and
   select a target cell based on the at least one additional measurement, wherein the second cell is selected as the target cell.

13. The UE of claim 11,
   wherein the first cell set comprises a third cell,
   wherein the processor is further configured to cause the UE to:
      perform at least one measurement of the third cell;
      perform a first comparison of the at least one measurement of the third cell using a first threshold; and
      perform a second comparison of the at least one measurement of the second cell using a second threshold, wherein the first and second thresholds are different, wherein the first threshold is an intra-cell set cell change threshold and the second threshold is an inter-cell set cell change threshold, wherein the cell change is in response to the first and second comparisons.

14. The UE of claim 11, wherein the processor is further configured to cause the UE to:
   receive dedicated configuration information in response to the access indication.

15. The UE of claim 14, wherein the dedicated configuration information includes a cell radio network temporary identity (C-RNTI).

16. A method, comprising:
at a cellular network:
   establishing a connection with a user equipment device (UE) via a first cell of the cellular network, wherein the first cell belongs to a first cell set configured by the cellular network;
   providing, to the UE via the first cell at a first time, measurement instructions and configuration information, wherein the configuration information comprises at least configuration of a second cell, wherein the second cell belongs to a second cell set configured by the cellular network and distinct and separate from the first cell set;
   receiving, from the UE at a second time, an access indication via the second cell, wherein the access indication is in response to a determination by the UE to perform a cell change to the second cell at the second time in response to a measurement event triggered by at least one measurement of the second cell by the UE based on the measurement instructions; and
   receiving data form the UE via the second cell without reestablishing layer 2 (L2).

17. The method of claim 16, further comprising:
   transmitting, to the UE, dedicated configuration information in response to the access indication.

18. The method of claim 17, wherein the dedicated configuration information includes a cell radio network temporary identity (C-RNTI).

* * * * *

UNITED STATES PATENT AND TRADEMARK OFFICE
CERTIFICATE OF CORRECTION

PATENT NO. : 12,177,729 B2  
APPLICATION NO. : 16/487039  
DATED : December 24, 2024  
INVENTOR(S) : Fangli Xu et al.

Page 1 of 1

It is certified that error appears in the above-identified patent and that said Letters Patent is hereby corrected as shown below:

In the Claims

Column 25, Line 60, Claim 2 delete "processing" and insert --processor--.
Column 26, Line 46, Claim 11 delete "establish connection" and insert --establish a connection--.

Signed and Sealed this
Eighteenth Day of March, 2025

Coke Morgan Stewart
*Acting Director of the United States Patent and Trademark Office*